Aug. 19, 1924.
W. SUKALLE
SKINNING KNIFE
Filed July 9, 1923
1,505,507
2 Sheets-Sheet 2
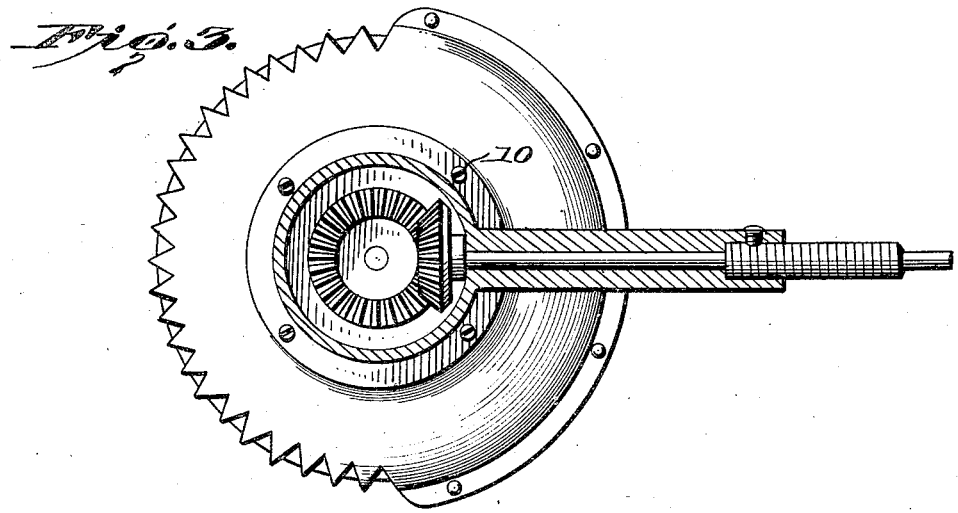
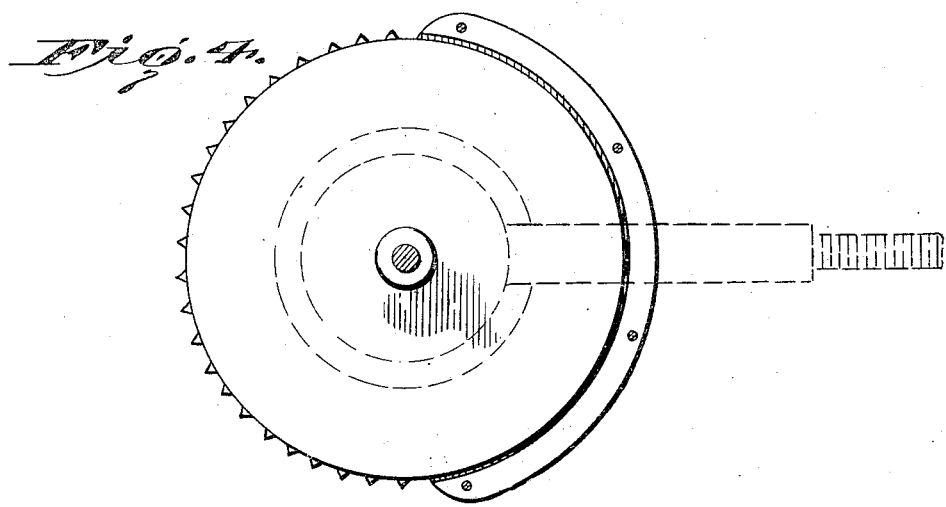
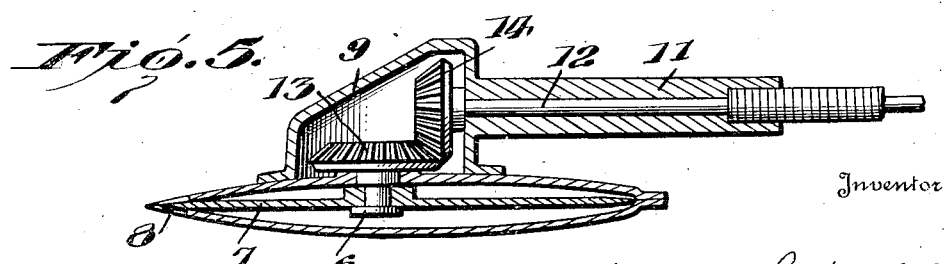
Inventor
William Sukalle Patented Aug. 19, 1924.

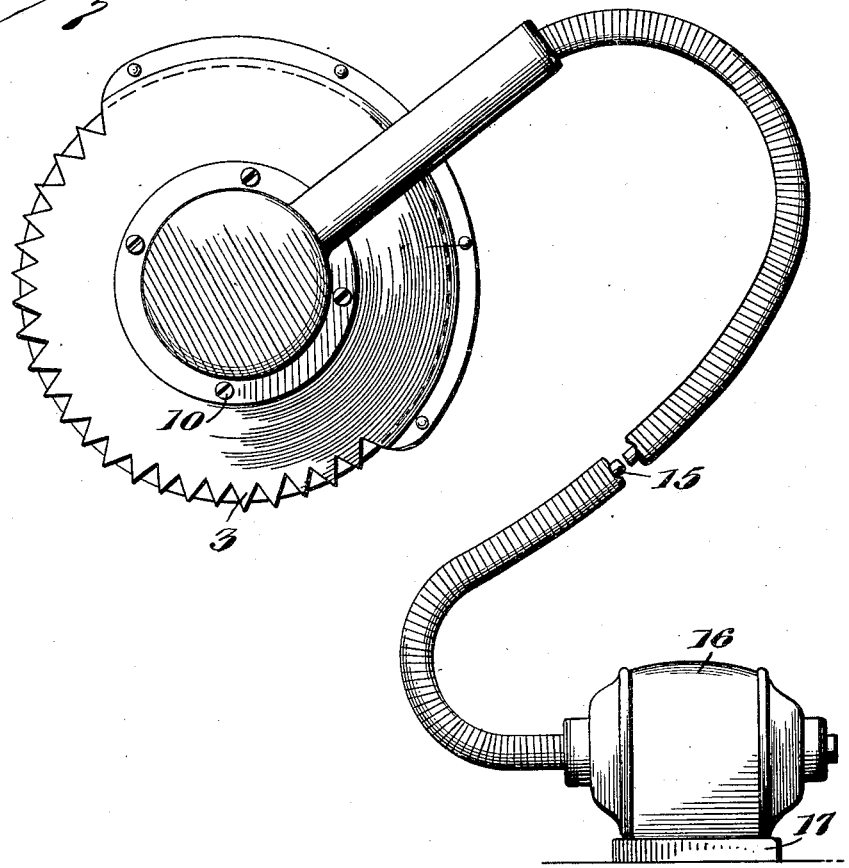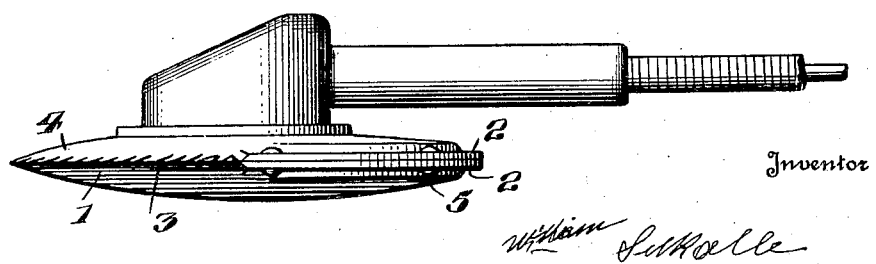

1,505,507

UNITED STATES PATENT OFFICE.

WILLIAM SUKALLE, OF PHOENIX, ARIZONA.

SKINNING KNIFE.

Application filed July 9, 1923. Serial No. 650,372.

*To all whom it may concern:*

Be it known that I, WILLIAM SUKALLE, a citizen of the United States, residing at Phoenix, in the county of Maricopa and State of Arizona, have invented certain new and useful Improvements in a Skinning Knife, of which the following is a specification.

This invention relates to improvements in knives, particularly to what is known as a skinning knife, for removing hide from slaughtered animals of all description.

The prime object of this invention is to provide a skinning knife, whereby the skin of an animal can be easily and quickly separated from the animal, without danger of cutting the hide in any way.

A further object of the invention is to provide a skinning knife, which can be easily and safely operated by one unskilled in the art, without danger of damaging the hide of the animal.

A still further object of the invention is to provide a knife of the above described character, which is provided with a guard whereby any possibility of the operator of the knife being accidentally injured by coming in contact with the knife is avoided.

And a still further object of my invention is to provide a skinning knife of the character indicated, which is capable of being operated by an electric motor.

Another object of the invention is to provide a knife of the character indicated, which is simple in construction, durable, efficient for the purpose intended, and one that can be manufactured and placed on sale at a relatively low cost.

These and like objects of the invention will be better understood as the description follows and as is specifically pointed out in the appended claims.

Referring to the accompanying drawings which form a part of this specification, and which clearly illustrate the construction and operation of my improved knife, Figure 1 is a perspective view of a skinning knife constructed in accordance with my invention.

Figure 2 is an end elevation of same.

Figure 3 is a vertical section through a knife constructed in accordance with my invention.

Figure 4 is a similar view looking in the opposite direction, and

Figure 5 is a horizontal section through my improved skinning knife.

Referring to the accompanying drawings in detail, like characters will be used to designate like parts in the different views.

In the drawings, the numeral 1 designates a disk constructed of metal or any suitable material, and which is formed concaved and provided on one-half of its periphery with a flange 2, while the other half of the periphery of same is provided with a serrated edge to form saw teeth 3. A second disk, which is indicated by the numeral 4, is constructed in the manner described for the disk 1, and is adapted to be secured in position against the disk 1 by means of bolts 5 that pass through the flanges 2 of the disks 1 and 4.

A shaft 6 is journaled in the disk 4 and mounted for rotation on the shaft 6 is a cutting knife 7, which is also in the form of a disk. The cutting edge 8 of the knife 7 extends within a short distance of the extreme end of the saw teeth 3.

A housing 9 is attached to the face of the disk 4 by means of screws 10, and a handle 11 is formed integral with the housing and provides a bearing for a shaft 12 that extends longitudinally therethrough. A bevel-gear 13 is keyed on the end of the shaft 6 and is adapted to mesh with a bevel-gear 14 keyed on the end of the shaft 12. Both of the bevel-gears are mounted within the housing 9.

The shaft 12, which is connected with a flexible shaft 15, is connected with an electric motor 16, mounted on a base support 17.

In the operation of my improved skinning knife, the disks 1 and 4 are inserted under the hide of the animal after a suitable slit in the hide has been made, and the motor 16 is started, which sets the disk knife 7 to operate, thus causing the knife to quickly separate the hide from the body of the animal, the saw teeth acting as a guide for the knife and at the same time preventing the knife from coming into contact with either the hide or body of the animal.

In view of the foregoing description of my invention taken in connection with the accompanying drawings, it is thought that any further explanation as to the construction, operation, and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:—

1. In a skinning knife, comprising a pair of spaced concaved disks adapted to be bolted together for a portion of approximately one-half of their circumference, a rotary knife blade positioned between said disks, one of said disks having an opening therein, a housing bolted upon said disk having an opening therein, and means extending from said housing through said opening for operating said rotary knife blade.

2. In a skinning knife, comprising a pair of spaced concaved disks adapted to be bolted together for a portion of approximately one-half of their circumference and having teeth formed upon the other half of their circumference, a rotary knife blade positioned between said disks, one of said disks having an opening therein, a housing bolted upon said disk having an opening therein, and means extending from said housing through said opening for operating said rotary blade, said teeth of each disk having sharp points adapted to extend beyond the periphery of said rotary knife blade.

In testimony whereof, I have affixed my signature in the presence of two witnesses.

WILLIAM SUKALLE.

Witnesses:
H. M. Brown,
Ramon Casas.